(12) United States Patent
Boffi et al.

(10) Patent No.: US 8,781,337 B2
(45) Date of Patent: *Jul. 15, 2014

(54) METHOD AND APPARATUS FOR OPTICAL PHASE MODULATION

(75) Inventors: Pierpaolo Boffi, Milan (IT); Lucia Marazzi, Milan (IT); Mario Martinelli, Milan (IT); Livio Paradiso, Milan (IT); Paola Parolari, Milan (IT)

(73) Assignee: Google Inc., Mountain View, CA (US)

( * ) Notice: Subject to any disclaimer, the term of this patent is extended or adjusted under 35 U.S.C. 154(b) by 318 days.

This patent is subject to a terminal disclaimer.

(21) Appl. No.: 13/226,149

(22) Filed: Sep. 6, 2011

(65) Prior Publication Data

US 2011/0317238 A1 Dec. 29, 2011

Related U.S. Application Data

(63) Continuation of application No. 10/592,032, filed as application No. PCT/EP2004/002450 on Mar. 10, 2004, now Pat. No. 8,019,232.

(51) Int. Cl.
*H04B 10/04* (2006.01)
*H04B 10/12* (2006.01)

(52) U.S. Cl.
USPC .................... 398/188; 398/183; 398/198

(58) Field of Classification Search
USPC .................. 398/183, 185, 186, 188, 198, 199
See application file for complete search history.

(56) References Cited

U.S. PATENT DOCUMENTS

| | | | | |
|---|---|---|---|---|
| 6,563,623 | B1* | 5/2003 | Penninckx et al. | 398/188 |
| 6,721,081 | B1* | 4/2004 | Mauro et al. | 359/279 |
| 7,116,460 | B2* | 10/2006 | Griffin | 359/245 |
| 8,019,232 | B2* | 9/2011 | Boffi et al. | 398/185 |
| 8,184,989 | B2* | 5/2012 | Maeda et al. | 398/188 |
| 2009/0190924 | A1* | 7/2009 | Snawerdt et al. | 398/33 |

* cited by examiner

*Primary Examiner* — Dalzid Singh
(74) *Attorney, Agent, or Firm* — Honigman Miller Schwartz and Cohn LLP

(57) ABSTRACT

A method of phase modulating optical radiation by the steps of phase modulating the optical radiation by using a modulator having an extinction ratio in order to provide a multilevel phase shift key signal, and applying to each optical pulse a phase-shift having an absolute value depending on the extinction ratio and a sign depending, for each of the optical pulses, on the respective optical phase value. An apparatus implementing the method is also disclosed.

16 Claims, 8 Drawing Sheets

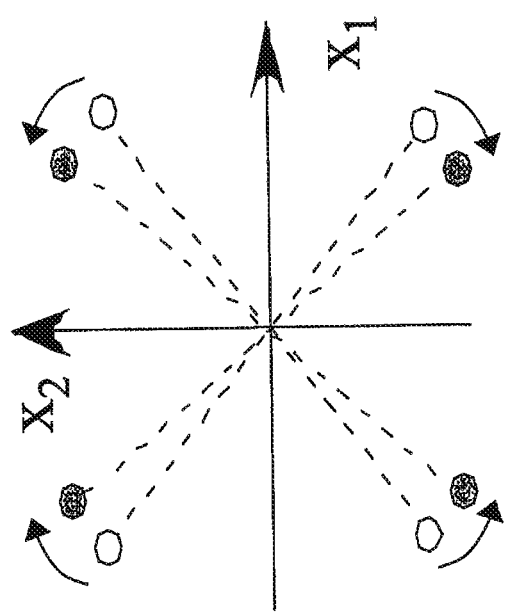

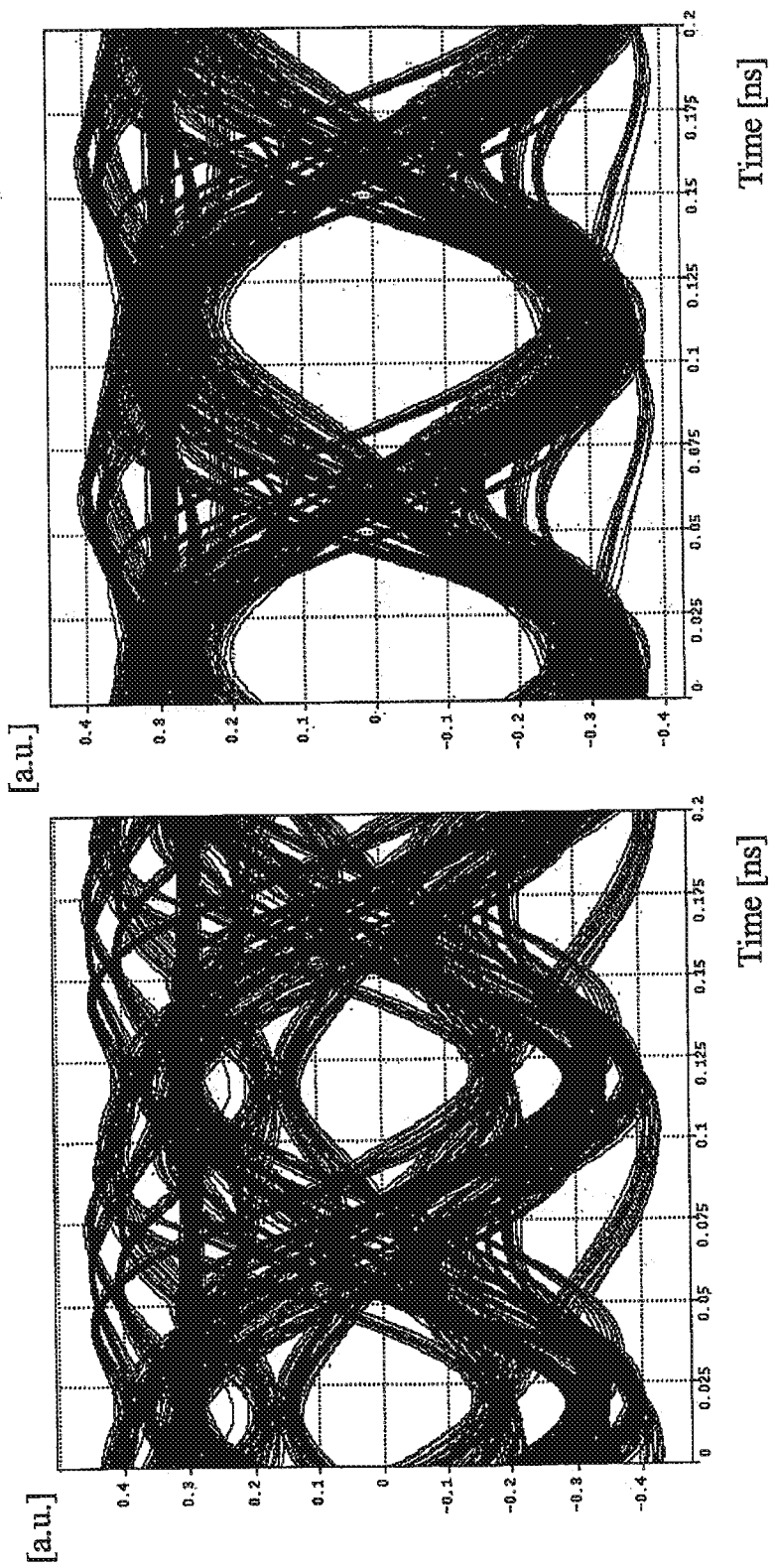

METHOD AND APPARATUS FOR OPTICAL PHASE MODULATION

CROSS REFERENCE TO RELATED APPLICATIONS

This application is a continuation of U.S. patent application Ser. No. 10/592,032 filed Jul. 9, 2007 (now U.S. Pat. No. 8,019,232), which is a national stage application based on PCT/EP2004/002450 filed Mar. 10, 2004, the content of which is incorporated herein by reference.

BACKGROUND OF THE INVENTION

1. Field of the Invention

The present invention generally relates to a method and apparatus for optical phase modulation for use in the field of optical telecommunication systems, in particular to a method and apparatus using the multi-level phase shift key (MPSK) modulation technique.

2. Description of the Related Art

Currently deployed optical telecommunication systems make mostly use of binary on-off key (OOK) modulation format with direct detection at the receiver (OOK/DD). In the art, OOK/DD is also referred to as (binary) intensity modulation with direct detection (IM/DD). By modulating the optical intensity, a binary-digital information signal is encoded in a corresponding binary-digital optical signal consisting of a stream of optical pulses. Usually, in OOK/DD format a logical binary digit (bit) "1" is associated to a first level of optical intensity in a time slot of the optical stream, while a logical bit "0" is associated to a second level of optical intensity different from the first level. The time slot corresponding to a single bit (both 1 or 0) is known as bit-period T [s] and the optical pulse stream is characterized by an optical rate B=1/T [s⁻¹]. In OOK/DD, the rate B of the optical signal is equal to the bit-rate of the encoded digital information and both are thus expressed in [bit/s] units. Exemplary optical bit-rates are 2.5, 10, 40 and 160 Gbit/s.

In the art, a general distinction is done between return to zero (RZ) and non-return to zero (NRZ) transmission. Independently from the modulation format, in RZ transmission the optical intensity of the optical signal always goes to a low intensity level between two adjacent pulses, while this does not happen in NRZ transmission. For the purpose of the present invention, "optical pulse", or equivalently "optical symbol", shall indicate the transmitted optical field, which solely occupies the time slot, or symbol-period, T and constitutes the elementary part of the transmitted optical stream, independently from the fact that the streamed optical field is pulsed or continuous.

In an attempt of increasing capacity of the optical telecommunication systems, modulation formats alternative to binary on-off key have been investigated. Among the alternative modulation formats, some phase shift key (PSK) techniques are particularly promising. These techniques encode information by modulating the optical phase of the carrier between a discrete set of M predetermined values. For example binary (M=2) phase shift key technique (BPSK) encodes a single bit in a time slot T by applying to the optical field in the time slot one phase value out of two predetermined phase values, which typically differ by π radians (0, π). Advantageously, $M=2^N$ in order to encode N bits of information in each transmitted optical symbol which is in a symbol-period T (multi-level or M-ary phase shift key—MPSK). The optical symbol rate B=1/T is expressed in [symbol/s] and the total transmission capacity [bit/s] is obtained by multiplying B by N. For example, in quaternary phase shift keying M=4 (N=2), the four phase symbols are typically in a quadrature constellation (quadrature phase shift keying—QPSK), as shown in FIG. 1. Here, $X_1$, $X_2$ is the phase symbol space and the depicted phase symbol values (+π/4, +3/4 π, +5/4π, −π/4) are arbitrary. The choice of a reference system is arbitrary as it depends on the absolute optical field phase, which is a priori unknown. The modulation format is characterized by the distance between symbols. Thus any quadrature constellation may be arbitrarily chosen by rotation of the one depicted. For the purpose of the present invention, the term "MPSK", or "multi-level phase shift keying", will be referred to modulation formats having M greater than 2.

In optical differential multi-level phase shift key (DMPSK) techniques, information is encoded in the differential optical phase associated to successive symbols. For example, in DQPSK the four values of the optical phase differences between adjacent pulses are 0, +π/2, +π and +3/2π. Typically, a digital pre-coder is used to differentially encode two binary data streams each at a bit rate B [bit/s] and the resulting encoded signals are subsequently fed to an optical modulator so that a single transmitted optical stream at the same symbol rate B [symbol/s] is obtained. Decoding can be performed optically without the employment of a coherent local oscillator, by using a pair of unbalanced Mach-Zehnder interferometers (MZI). Advantageously, each MZI has one arm dimensioned in order to introduce an optical time delay equal to one symbol period with respect to the other arm. By setting the differential optical phase between the interferometer arms respectively to +π/4 and −π/4 and by employing balanced optical detectors (also known as differential photoreceiver) at the output of each interferometer, the DQPSK signal is converted back into two binary intensity sequences which represent the two original data streams at B [bit/s].

For each MZI, the output current $I_{out}$ after the balanced photodetector is proportional to:

$$I_{out} \div \frac{I_{in}}{2} \cos\left(\Delta \pm \frac{\pi}{4}\right) \qquad (1)$$

where $I_{in}$ is the input optical intensity into the MZI, $\Delta$ is the received phase difference between adjacent pulses and the sign plus or minus holds for MZI having differential optical phase between the interferometer arms equal to +π/4 and −π/4, respectively.

In order to perform a QPSK modulation, it has been proposed the use of a single phase-modulator driven by a four-level electrical input voltage in order to directly obtain the required four output phase levels. This solution has the disadvantage that commercially available phase-modulators need very high drive voltages $V_\pi$. Besides that, it is necessary to drive the modulator with a voltage able to generate a 0 to 3/2π phase swing, feeding the modulator with more than $V_\pi$, thus increasing drive electronics costs. In general, the "drive voltage", $V_\pi$, of a phase shifter is defined as the voltage which produces a phase shift of π at the optical carrier frequency.

Alternatively, it is known in the art the use of a cascade of two phase shifters, the first one producing a 0-π modulation, the second one a 0-π/2 modulation, or vice versa. Typically, a push-pull Mach-Zehnder Modulator (MZM) biased at the zero point and driven at a voltage equal to double the π voltage, $V_\pi$, is used to apply the π-depth phase modulation. In case of a MZM, the π voltage, $V_\pi$, is defined as the voltage which produces a phase shift difference between the first and second arm of π. A phase modulator consisting of a single waveguide with one electrode driven at half the π voltage may be used to apply the π/2-depth phase modulation.

In patent application WO 03/049331 it is disclosed a method and apparatus for encoding an optical signal having improved dispersion tolerance in a WDM optical communications system. There is provided a DQPSK modulator arrangement comprising a laser for producing an optical signal, which signal is split by a splitter, each part of the split signal being applied to a respective phase modulator, exemplarily a MZM. Each phase modulator is adapted to modulate the phase of the signal by 0 or π radians in dependence upon a respective drive voltage. The optical output of at least one modulator is passed through a phase shifter which applies a phase shift of π/2, such that the relative phase difference between the two parts of the split optical signals is ±π/2. A control electrode is used to provide the fine control. The split signals are recombined by an optical recombiner to form an optical PSK output. A further phase modulator is provided after the recombiner to chirp the optical PSK output. Exemplarily, the further phase modulator applies a π/4 phase modulation to the output signal and it is driven by an oscillator which provides the clock rate corresponding to the data line rate. The oscillator must be synchronous with the data clock rate, i.e. it should be phase locked with the data stream.

Chirping relates to the variation of an optical signal's phase modulation, i.e. the optical phase is changed continuously within the symbol period in order to improve dispersion tolerance.

A generic interferometric modulator, such as for example a MZM, has an associated "extinction ratio" ("ER") which is defined as the ratio between maximum and minimum optical intensity at the output of the modulator when operated in intensity modulation. Such extinction ratio typically depends not only on splitting ratios of input and output couplers of the interferometer but also on the rate at which the modulator is operated. For the purpose of the present invention, "Radio Frequency extinction ratio" ("RF-ER") means the ER measured at high frequency modulation rate, i.e. higher than 1 Gbit/s, typically higher or equal than about 2.5 Gbit/s. For example, MZMs having two electrodes driven independently, known in the market as dual-drive MZMs (DD-MZM), typically show a Radio Frequency modulation ER which ranges between about 11 to 15 dB.

Applicant has found that a finite value of the ER of a modulator affects the MPSK optical signal emitted by the modulator with a phase error depending on the value of the ER.

For the purpose of the present invention, we will refer to a "non-ideal" or "finite" ER as a RF-ER equal to or less than about 30 dB. An "ideal" ER means a RF-ER greater than about 30 dB.

The Applicant has faced the problem of modulating an optical radiation in a multi-level phase shift key format while reducing the error in the phase of the transmitted optical symbols to an acceptable value. In particular, Applicant has faced the problem of reducing the optical phase error in a MPSK modulated signal due to the extinction ratio of the modulator employed for MPSK modulation. The Applicant has verified that the above problems are particularly relevant in the differential multilevel phase shift keying transmission, more particularly in the differential multilevel phase shift keying transmission employing a dual-drive MZM, and a need for better quality optical modulation is therefore strongly felt in these applications.

SUMMARY

Applicant has found a solution to the problem of generating a proper MPSK signal by modulation, also in presence of a non-ideal ER of the modulator, while avoiding detrimental amplitude modulation.

The Applicant has found that it is possible to suitably reduce the phase error induced by the ER of an interferometric MPSK modulator by placing a phase shifter at the output end of the modulator and driving the phase shifter by a proper algorithm.

Advantageously, the phase shifter applies to the MPSK signal a phase shift which is substantially constant along the symbol-period. The applied phase shift has an absolute value which is a function of the ER of the modulator, preferably decreasing with increasing ER, more preferably inversely proportional to ER. Preferably, the sign of the phase-shift is determined on a symbol-by-symbol basis, in dependence on the phase-symbol value of each symbol. A proper algorithm decides the right sign of the phase-shift and feeds the phase shifter driver.

The present invention allows relaxing the ER requirements in MZM fabrication and, for example, makes possible the use of a commercially available DD-MZM for MPSK modulation. The solution is simple and cost-effective, in that it relaxes constraints in the design of the MZM. In particular, splitting ratios of the couplers included in the MZI do not need to be necessarily close to the ideal 3 dB value. Furthermore, there is no need to precisely balance interferometer arm losses.

In a first aspect, the invention relates to a method for modulating an optical radiation, the method comprising the steps of phase-modulating an optical radiation with a modulation signal, by using a modulator having an extinction ratio, so as to obtain a multi-level phase shift key optical signal including a stream of optical pulses, wherein each of said optical pulses has a respective optical phase value related to said modulation signal and applying to each of said optical pulses a phase-shift having an absolute value related to said extinction ratio and a sign related, for each of the optical pulses, to said respective optical phase value. Preferably the phase-shift is substantially constant in each of said optical pulses. Advantageously the absolute value of said phase-shift is equal to or less than about π/10.

More preferably, the absolute value of said phase-shift is determined as a function of said extinction ratio, said function being a decreasing function with increasing of extinction ratio, for example according to the approximate relation $$\mathrm{arctg}\left(\frac{1}{ER_{lin}}\right),$$

wherein $ER_{lin}$ is the extinction ratio.

The method of the present invention may further comprise the steps of providing a first and a second logical signal ($S_1$, $S_2$) linked with said modulation signal, generating a first and a second driving signal for said modulator from said first and second logical signal and establishing said sign as a logical function of said logical signals, for example through a logical relation equivalent to NOT[XOR($S_1,S_2$)].

The multilevel phase shift key optical signal can be a quadrature phase shift key optical signal or a differential multilevel phase shift key optical signal.

In a second aspect, the invention relates to a method of optical communication comprising transmitting an optical signal at a first location and receiving the optical signal at a second location different from the first location, wherein transmitting comprises modulating the optical signal according to the method above.

In a third aspect, the invention relates to an electro-optical apparatus for modulating ah optical radiation based on a modulation signal, comprising an optical modulator apt to receiving an optical radiation and generating a multilevel phase shift key optical signal including a stream of optical pulses, each having a respective optical phase value related to said modulation signal, said optical modulator having an extinction ratio and being apt to being driven by a first and a second driving signal and a phase-shifter optically connected to the optical modulator, apt to applying to the phase of each optical pulse a phase-shift having an absolute value related to said extinction ratio and a sign depending, for each of the optical pulses, on said respective optical phase value; and a logical circuit apt to generating a third driving signal logically related to said first and second driving signals, the logical circuit being logically connected to the phase-shifter for feeding said third driving signal to said phase-shifter.

Preferably, the third driving signal determines said sign of said phase shift.

The optical modulator may comprise a dual-drive Mach-Zehnder modulator.

The optical modulator is advantageously an optical modulator apt to receiving an optical radiation and generating a quadrature phase shift key optical signal.

In a fourth aspect, the invention relates to an optical transmitter comprising an optical source optically coupled to the electro-optical apparatus described above.

In a fifth aspect, the Invention relates to an optical communication system comprising an optical transmitter for transmitting an optical signal, an optical receiver for receiving the optical signal, and an optical communication line connecting the transmitter to the receiver, wherein the transmitter comprises the apparatus described above.

BRIEF DESCRIPTION OF THE DRAWINGS

The features and advantages of the present invention will be made apparent by the following detailed description of some exemplary embodiments thereof, provided merely by way of non-limitative examples, description that will be conducted by making reference to the attached drawings, wherein:

FIG. 3 shows a perturbation of the QPSK constellation of FIG. 1 due to non-ideal (finite ER) MZM modulation.

FIGS. 7a and 7b show simulated eye diagrams of a NRZ DQPSK signal at 10 Gbit/s generated by a DD-MZM transmitter with ER=15 dB before and after phase correction, respectively;

DETAILED DESCRIPTION

Figure 2:
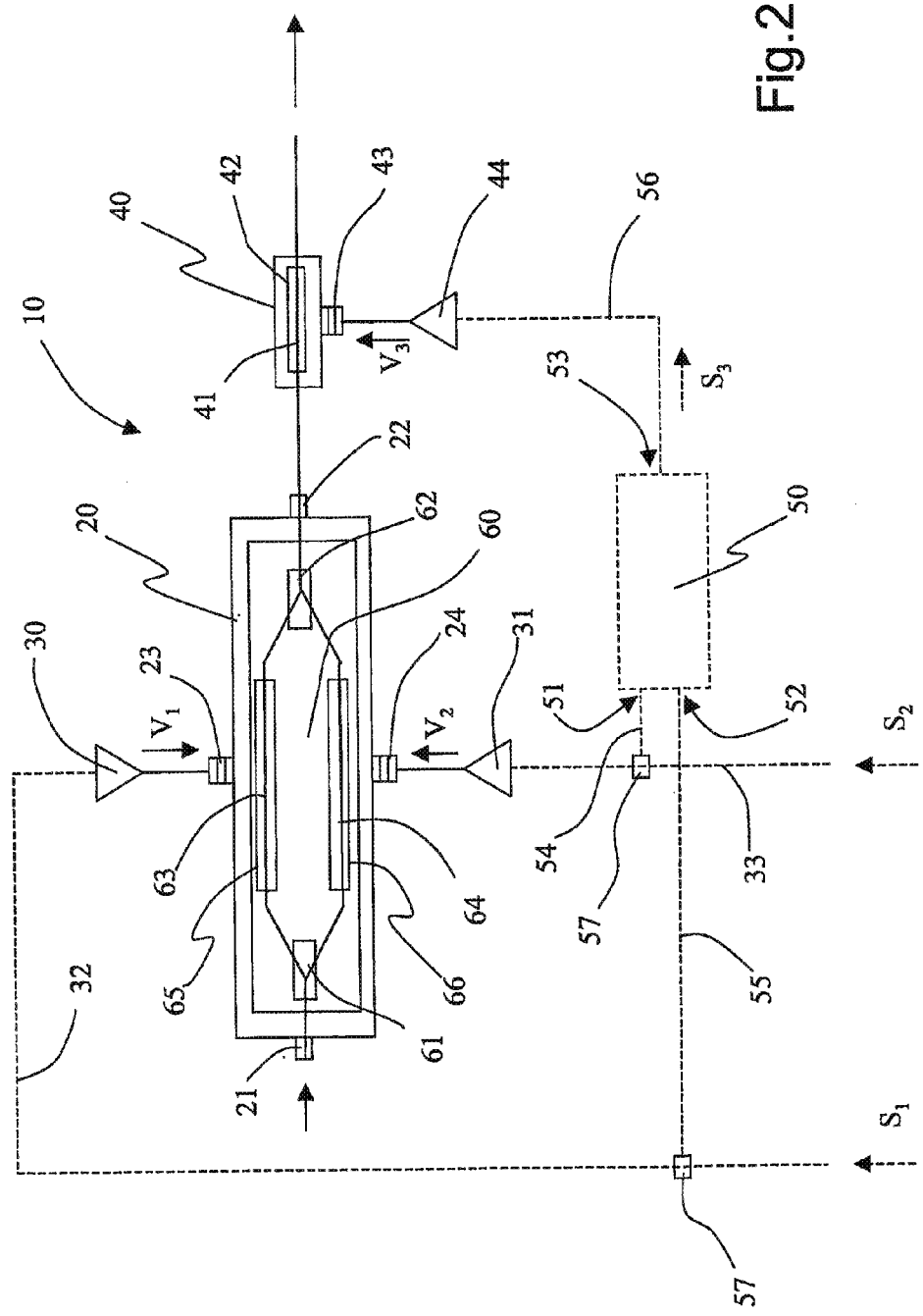
FIG. 2 shows a schematic diagram of an exemplary optical device according to the invention.

FIG. 2 shows an exemplary optical device 10 according to a particular embodiment of the invention.

The device comprises an optical modulator 20, a phase shifter 40 optically connected to the modulator 20 and a logical circuit 50.

The optical modulator 20 comprises an optical input 21 and an optical output 22. Typically, the modulator 20 has a first driving input 23 and a second driving input 24. A first driver 30 and a second 31 driver 31 are connected to respectively the first and second driving input 23, 24. A first signal transmitting line 32 and a second signal transmitting line 33 are connected to the input of first and second driver 30,31 respectively.

Modulator 20 may be any kind of MPSK modulator. Advantageously, it may comprise an interferometric modulator 60 such as, for example, a MZM. The MZM has an optical divider 61, an optical combiner 62, a first optical arm 63 and a second optical arm 64 arranged in parallel between the optical divider 61 and the optical combiner 62. The MZM 60 advantageously comprises a first phase-shifting device 65 and a second phase-shifting device 66 acting respectively on the first and second optical arm 63,64 for changing the optical phase of an optical radiation traveling respectively in the first and second optical arm 63,64. Phase-shifting devices 65 and 66 may be any kind of optical phase shifter or phase modulator, such as for example MZM (either single drive, push-pull or dual-drive MZM). In this case the modulator 60 takes the form of a MZ super-structure having a pair of MZM in parallel configuration. In a more preferred configuration phase-shifting devices 65 and 66 are electrodes (e.g. traveling wave electrodes) associated to the optical arms 63 and 64. In this latter preferred configuration, the modulator 60 is known in the art as a (symmetric) dual-drive MZM (DD-MZM).

An optical phase-shifting device 40 is optically connected, e.g. by a suitable waveguide such as a planar waveguide or an optical fiber, to the output 22 of the modulator 20, advantageously in a downstream position with respect to the direction of propagation of an optical radiation. Such device 40 may be a phase modulator or a phase shifter. Preferably the phase shifting device 40 comprises an electrode 42 associated to a waveguide 41 through which the optical signal propagates. For example it may be a traveling wave integrated optical phase modulator. Typically, the device 40 has a driving input 43. A driver 44 is connected to the driving input 43.

A logical circuit 50 has a logical output 53 associated to the driver 44, for example by way of a signal transmitting line 56. In a particular configuration, the logical circuit has a first logical input 51 and a second logical input 52. Preferably, a first signal transmitting line 54 and a second signal transmitting line 55 are connected to the first and second logical input, respectively. Optionally, a pair of splitting 10' devices 57 provides a connection between signal transmitting line 32 and 55 and between signal transmitting line 33 and 54.

In an alternative configuration, the logical circuit 50 may be part of a logical pre-coder (not shown), for example of the type commonly used in the art to encode DMPSK signals.

In use, an optical radiation impinges on the modulator 20 at its optical input 21. The optical radiation may be generated by an optical source (not shown), e.g. a distributed feedback (DFB) semiconductor laser or external cavity laser (ECL) or a narrow linewidth laser suitable for telecommunication applications (FVVHM<10 MHz). The optical radiation may be a continuous wave radiation or a modulated radiation. For example, in a typical RZ transmission configuration, the optical radiation may be a stream of optical pulses having a duty cycle and a clock rate, or pulse rate, and may be obtained by an RZ optical shaper (not shown). The RZ shaper can be any intensity modulator, including electroabsorption modulators or single-drive Mach-Zehnder modulators. Optionally, the optical shaper may be integrated with, or placed at, the output of the modulator 20. The modulator 20 phase-modulates the optical radiation in order to generate at the optical output 22 an MPSK optical signal. The first driver 30 and the second driver 31 drive the modulator by using a first and a second drive voltage signal, respectively $V_1$ and $V_2$. Each of the two drivers 30, 31 receives a respective logical signal. $S_1$ and $S_2$, through the respective transmitting lines 32 and 33. The drive voltage signals $V_1$, $V_2$ depend upon the respective logical signals $S_1$ and $S_2$. For the purpose of the present invention, an optical device such as a modulator or a phase-shifter will be regarded as driven equivalently by the drive voltage signals (e.g. $V_1, V_2$) or by the respective logical signals (e.g. $S_1$ and $S_2$). In an exemplary configuration, when the modulator is a QPSK modulator, the signals $S_1$ and $S_2$ are typically binary and the signals $V_1$ and $V_2$ are typically two level voltage signals. In a typical configuration, for example in case of a DMPSK transmission, the logical signals are generated by a pre-coder (not shown) using known techniques. Preferably, the two (RF) logical signals are independent from each other. Each two-level voltage signal drives one arm of the interferometric modulator 60, which allows applying a different phase change in each of the arms. A careful synchronization, for example by way of RF electrical phase shifters, between the two logical signals at the input of the first and the second driver is advantageous in order to obtain the desired undistorted M-level phase modulated signal.

In a preferred configuration wherein the modulator 60 is a MZM, the field transfer function of the modulator 60 can be written, without considering attenuation and chirping, as $$E_o = E_{in}\left(\cos\phi_d - j\frac{1}{ER_{lin}}\sin\phi_d\right)e^{j\phi_s} \quad (2)$$

wherein $E_o$ is the optical field at the output 22 of the modulator 60, $E_{in}$ is the optical field at the input 21 of the modulator 60 and $ER_{lin}$ is the (linear) Extinction Ratio. In the above expression, use has been done of the following notation:

$$\begin{cases}\phi_d = \dfrac{\phi_1 - \phi_2}{2} \\ \phi_s = \dfrac{\phi_1 + \phi_2}{2}\end{cases}$$

wherein $\phi_1$ and $\phi_2$ are the phase-shifts applied to the optical radiation traversing respectively the first and second arm 63, 64.

In a more preferred configuration wherein the modulator 20 is a DD-MZM, phase-shifts $\phi_1$ and $\phi_2$ are related to respective driving voltages $V_1$ and $V_2$ according to the relation: $\phi_i = \pi V_i/V_\pi$ (i=1,2), where $V_\pi$ is DD-MZM modulator $\pi$ voltage. It is remarked that in the special case of a 2-level 0-$\pi$ phase modulation, not contemplated by the present invention, the added phase vanishes ($\phi_s$=0) and $\phi_d$ is 0 or $\pi$ according to the input signal. Equation (1) reduces to $E_o = E_{in}\cos\phi_d$ and the extinction ratio does not affect the transmitted 0-$\pi$ constellation.

Equation (2), by neglecting the second term of the right-hand side, i.e. in the presence of an Ideal MZM having an infinite extinction ratio, reduces to:

$$E_o = E_{in}\cos\phi_d e^{j\phi_s} \quad (3)$$

In table 1 an exemplary set of phases $\phi_s$ and $\phi_d$ is shown as a function of the applied voltages, $V_1$ and $V_2$, for an exemplary QPSK signal generated by a DD-MZM modulator. The right-most column shows the corresponding transmitted phase symbol $\phi_{sym}$ in the constellation of FIG. 1. Also shown is an exemplary set of binary logical signals $S_1$ and $S_2$, which determine the driving voltages. The specific relationship between $V_{1,2}$ and $S_{1,2}$ is arbitrary.

TABLE 1

| $S_1$ | $S_2$ | $V_1$ | $V_2$ | $\phi_1$ | $\phi_2$ | $\phi_d$ | $\phi_s$ | $\phi_{sym}$ (QPSK phase symbol) |
|---|---|---|---|---|---|---|---|---|
| 0 | 1 | 0 | ½$V_\pi$ | 0 | +π/2 | −π/4 | +π/4 | +π/4 |
| 0 | 0 | 0 | −½$V_\pi$ | 0 | −π/2 | +π/4 | −π/4 | −π/4 |
| 1 | 1 | $V_\pi$ | ½$V_\pi$ | +π | +π/2 | +π/4 | +¾π | +¾π |
| 1 | 0 | $V_\pi$ | −½$V_\pi$ | +π | −π/2 | +3π/4 | +π/4 | −¾π |

Figure 1:
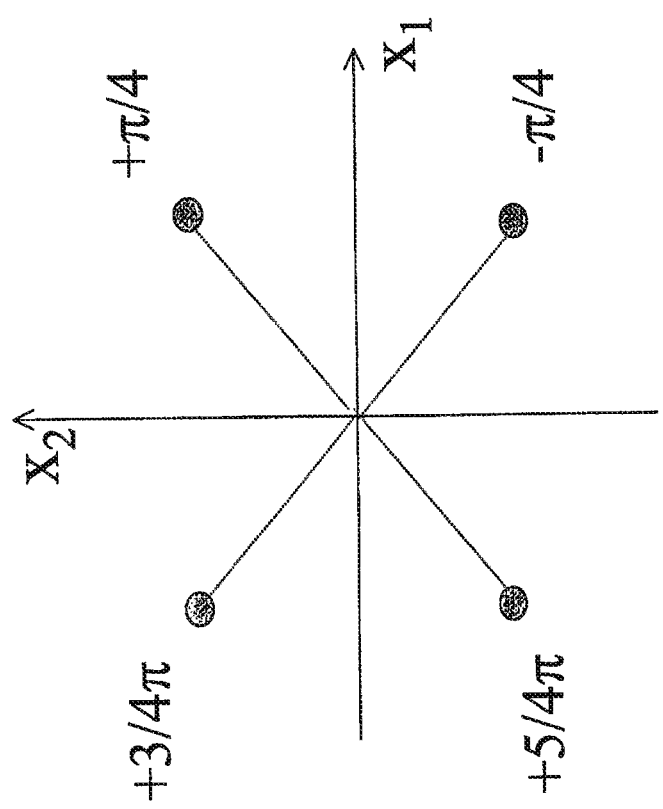
FIG. 1 shows a symbolic diagram of a particular QPSK constellation

In the ideal case of an infinite ER, applying the proper phase shifts ($\phi_1$ and $\phi_2$) to arms 63 and 64 it is possible to obtain a constant output optical amplitude and the four-level phase constellation corresponding to the QPSK modulation format shown in FIG. 1.

In order to ensure phase quadrature between the two phase-shifts $\phi_1$ and $\phi_2$, a proper control of the modulator bias or drive voltages $V_1$ and $V_2$ is preferred, e.g., by means of well-known techniques (e.g. feedback circuit).

Applicant has found that when using an interferometric modulator, having an extinction ratio ER, the RF-ER causes a distortion of the MPSK phase constellation with respect to the desired MPSK constellation. In fact, due to the ER of the modulator, a phase deviation $\phi_e$ is added to the constellation. The value of the phase deviation $\phi_e$ is computed as:

$$\phi_e = \arctg\left(\frac{\mathrm{Im}(E_o)}{\mathrm{Re}(E_o)}\right) = \arctg\left(-\frac{\sin\phi_d}{ER_{lin}\cos\phi_d}\right) = \arctg\left(-\frac{tg\phi_d}{ER_{lin}}\right). \quad (4)$$

The term $tg(\phi_d)$ is equal to +1 or −1, due to the fact that when the output field intensity in (3) is kept constant, $\phi_d$ is π/4±π/2 (n=1,2,3) and the phase deviation alternatively adds or subtracts to the desired phase levels.

In table 2 the phases, $\phi_{1,2}$, $\phi_{s,d}$ and $\phi_{sym}$ and the phase error $\phi_e$ are shown as a function of the driving voltages $V_1$ and $V_2$ in the particular case of table 1:

TABLE 2

| $V_1$ | $V_2$ | $\phi_1$ | $\phi_2$ | $\phi_s$ | $\phi_d$ | $\phi_{sym}$ phase symbol) | $\phi_e$ |
|---|---|---|---|---|---|---|---|
| 0 | ½$V_\pi$ | 0 | +π/2 | +π/4 | −π/4 | +π/4 | +|$\phi_e$| |
| 0 | −½$V_\pi$ | 0 | −π/2 | −π/4 | +π/4 | −π/4 | −|$\phi_e$| |
| $V_\pi$ | ½$V_\pi$ | +π | +π/2 | +¾π | +π/4 | +¾π | −|$\phi_e$| |
| $V_\pi$ | −½$V_\pi$ | +π | −π/2 | +π/4 | ¾π | −¾π | +|$\phi_e$| |

In FIG. 3 it is shown the degraded QPSK constellation of FIG. 1 due to the finite ER of the interferometric QPSK modulator. Blank circles represent the desired constellation, filled circles the distorted constellation.

As an example, when using the distorted QPSK constellation of table 2 for DQPSK transmission, the modulator ER causes phase distances (Δ) among the transmitted phase symbols to be different from pre-selected values 0, +π/2, +π and −π/2. As is clear from FIG. 3 and table 2, the distorted DQPSK constellation is 0, +π/2±|ϕ_e|, and −π/2±|ϕ_e|.

Figure 4A:
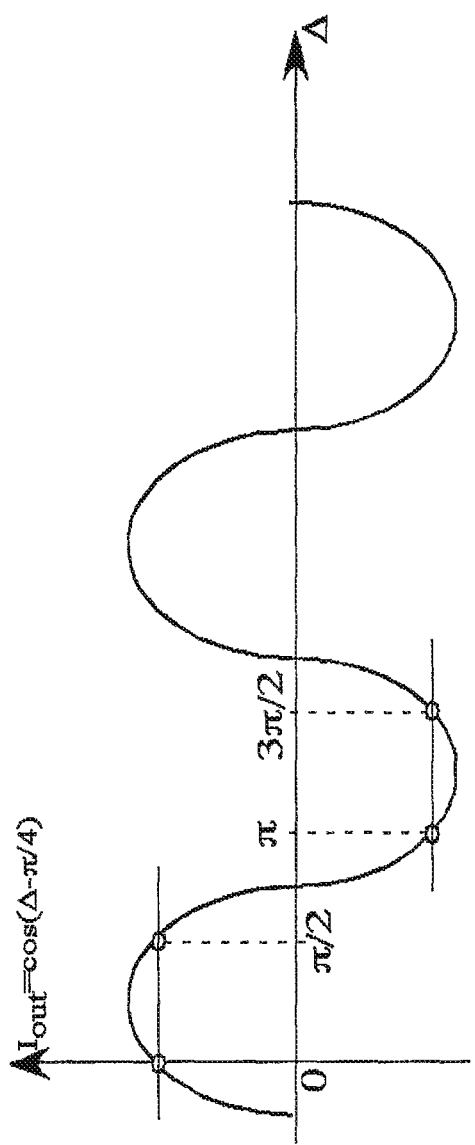
FIGS. 4a and 4b show an output current after the differential photodetector with the original and the distorted constellation, respectively.
Figure 4B:
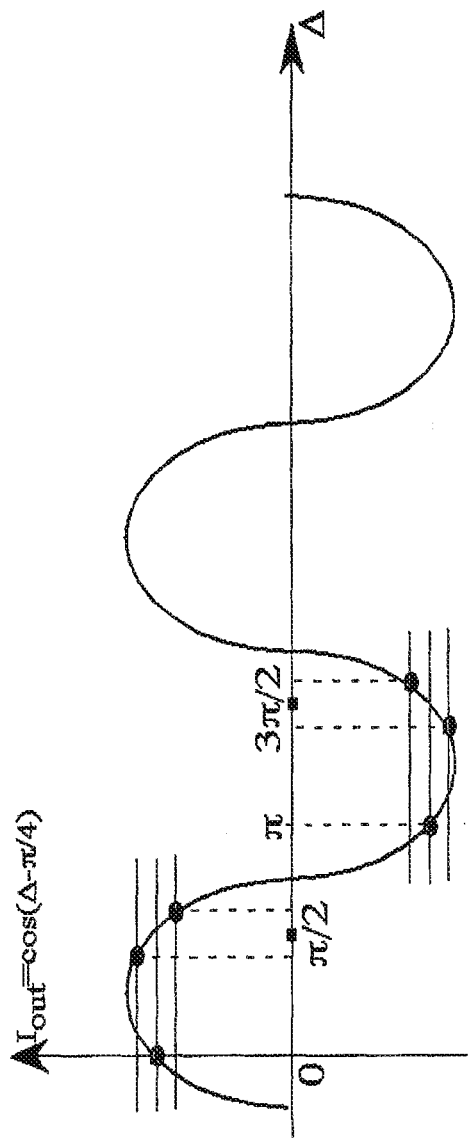

At the unbalanced Mach-Zehnder receiver, according to (1), the detected signal is no more binary, but six different current levels are generated. FIG. 4a shows an output current after the balanced photodetector for the desired DQPSK constellation and FIG. 4b shows an output current after the balanced photodetector for the distorted DQPSK constellation.

Applicant has found that it is possible to counteract the phase distortion due to the ER by applying a proper phase-shift to the MPSK optical signal outputting from the modulator 20. The MPSK optical signal outputting from the modulator 20 impinges on the device 40, which is suitable to selectively apply a phase-shift $\phi_c$ to the optical phase of the MPSK optical signal. Advantageously, the phase contribution to be applied is selected on a symbol-by-symbol basis. Preferably the applied phase-shift is approximately constant over the symbol period T, being contemplated that a possible transient between successive symbols does not depart from the phase-shift being approximately constant. More preferably, the applied phase-shift has a sign, which is selectively determined symbol-by-symbol as a function of the symbol phase value. Even more preferably, the applied phase-shift has a magnitude, which is a function of ER. The phase-shift magnitude is advantageously the same for substantially all the optical symbols generated by the modulator 20.

The sign of the phase-contribution to be applied is determined on a symbol-by-symbol basis in dependence on the phase value of the transmitted optical symbol. It is in general convenient to find a logical relation which gives the sign of the phase-contribution as a function of the logical signals (e.g. $S_1$, $S_2$) feeding the drivers (e.g. 30, 31) of the modulator 20. A general method suitable to find the logical relationship comprises the step of building a table with all the transmitted phase symbol values in dependence of all the possible values of the logical signals and with the phase distortions associated to each phase symbol value. Using known synthesis techniques, it is possible to find the logical relationship and to build a suitable logical circuit 50 implementing the resulting relation.

As an example, in case of a QPSK transmission, from tables 1 and 2 it is possible to derive the logical relationship: NOT[XOR ($S_1,S_2$)], where $S_1$ and $S_2$ are the binary logical signals in input to the drivers 30,31 driving the two arms 63,64 of the modulator 60, XOR is the logical operation EXCLUSIVE OR and NOT is the logical INVERSION. The result of the algorithm determines the sign of the phase contribution: a logical "1" will correspond to a positive phase contribution, a logical "0" to a negative phase contribution.

Figure 5:
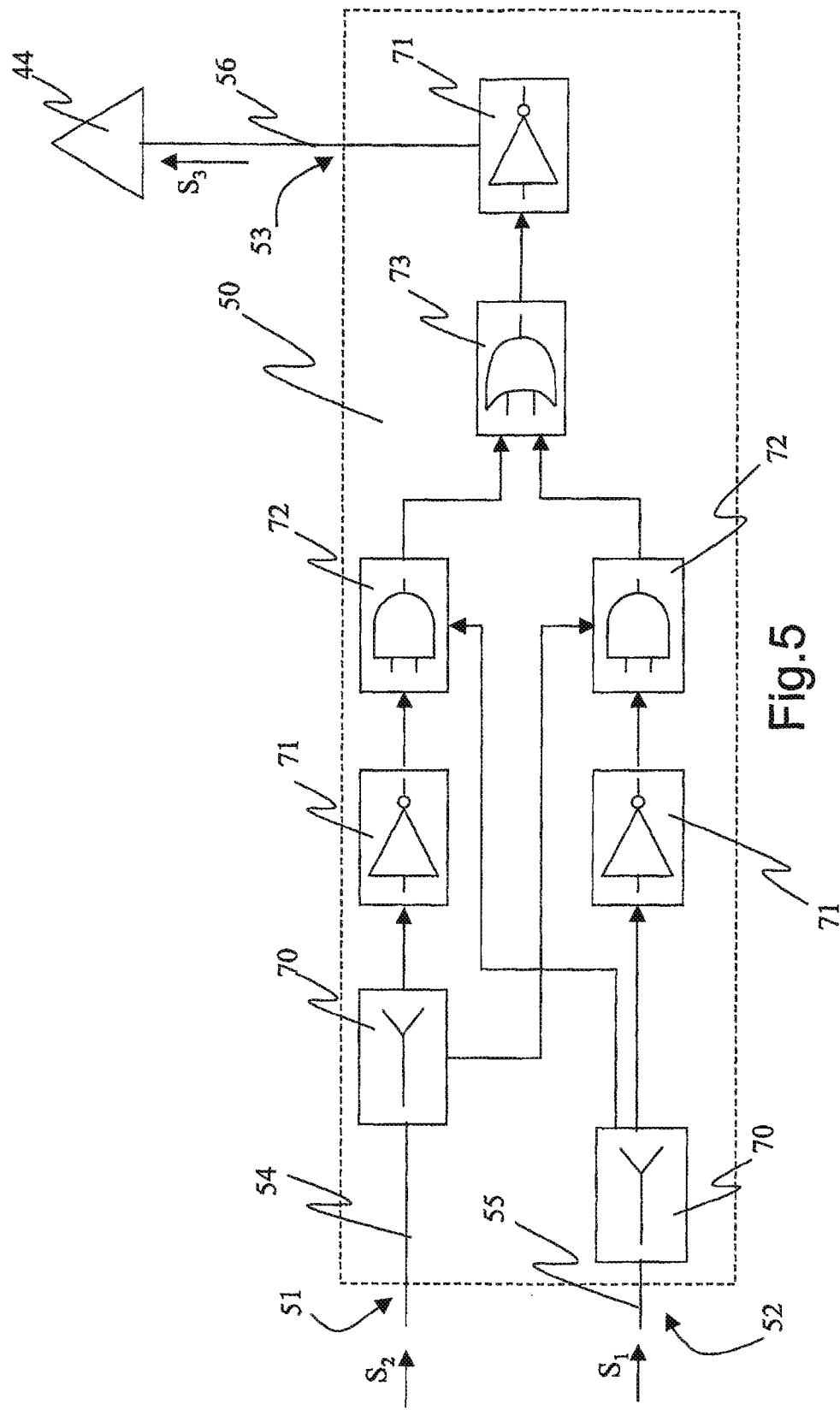
FIG. 5 shows an exemplary logic circuit implementing the sign of the phase correction.

Exemplarily, FIG. 5 shows a logical representation of a particular embodiment of a logical circuit 50 suitable to implement a logical relationship NOT[XOR ($S_1,S_2$)] valid for an exemplary QPSK transmission, in which a same reference numeral is assigned to elements having the same functionality. Logical blocks 70 represent logical splitters, blocks 71 represent inverters, blocks 72 represent AND gates and block 73 represents OR gate. Advantageously, no use has been done of XOR gates. In this case, signals $S_1$ and $S_2$ feed the two input ports 52 and 51, respectively.

An output logical signal $S_3$ is generated at the output 53, wherein $S_3$=NOT[OR($S_1$ AND (NOT($S_2$)), (NOT($S_1$)) AND $S_2$)], which is equivalent to NOT[XOR ($S_1,S_2$)]. The logical signal $S_3$ is directed to driver 44 through the signal transmitting line 56.

In an alternative configuration, the logical operation giving the sign of the above phase-shift may be performed directly by a suitable pre-coder, such as for example a pre-coder for a DMPSK transmission. In this case the logical circuit 50 can be integrated in said precoder and it may derive the logical signal determining the sign of the phase-shift to the driver 44 of the phase shifter 40 directly from the original data streams feeding the precoder, without making use of the logical signals feeding the modulator (e.g. $S_1$ and $S_2$). In this case, an equivalent relation will be valid between the original data streams and the logical signal to the driver 44 and the logical circuit 50 will be designed according to it. In any case, the logical signal to the driver 44 and the logical signals to the modulator (e.g. $S_1$ and $S_2$) will be linked by the same relation of the previous embodiment.

Advantageously, the phase shifter 40 applies the phase-shift $\phi_c$ whose magnitude, from (4), is substantially given by:

$$|\phi_c| = \arctan\left(\frac{1}{ER_{lin}}\right) \approx \frac{1}{ER_{lin}}. \tag{5}$$

Table 3 (derived from (5)) shows different values of the phase correction as a function of different modulator extinction ratios. It can be seen that for currently typical commercially available MZMs, the necessary phase contribution is equal to or less than about 16°, or equivalently equal to or less than about π/10. The phase shifter 40, which is driven by the driver 44, does not require high drive voltages ($V_3$).

TABLE 3

| ER (dB) | $|\phi_c|$ (deg) | $|\phi_c|$ (rad) |
|---|---|---|
| 11 | 15.7° | 0.27 |
| 12 | 14.1° | 0.25 |
| 13 | 12.6° | 0.21 |
| 14 | 11.3° | 0.19 |
| 15 | 10.1° | 0.17 |

Figure 6A:
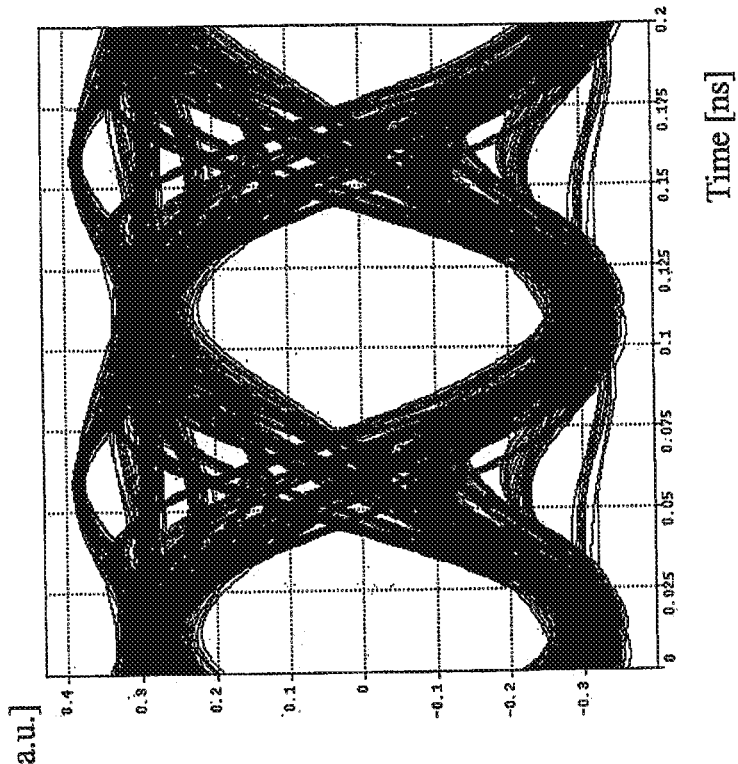
FIGS. 6a and 6b show simulated eye diagrams of a NRZ DQPSK signal at 10 Gbit/s generated by a DD-MZM transmitter with ER=20 dB before and after phase correction, respectively.
Figure 6B:
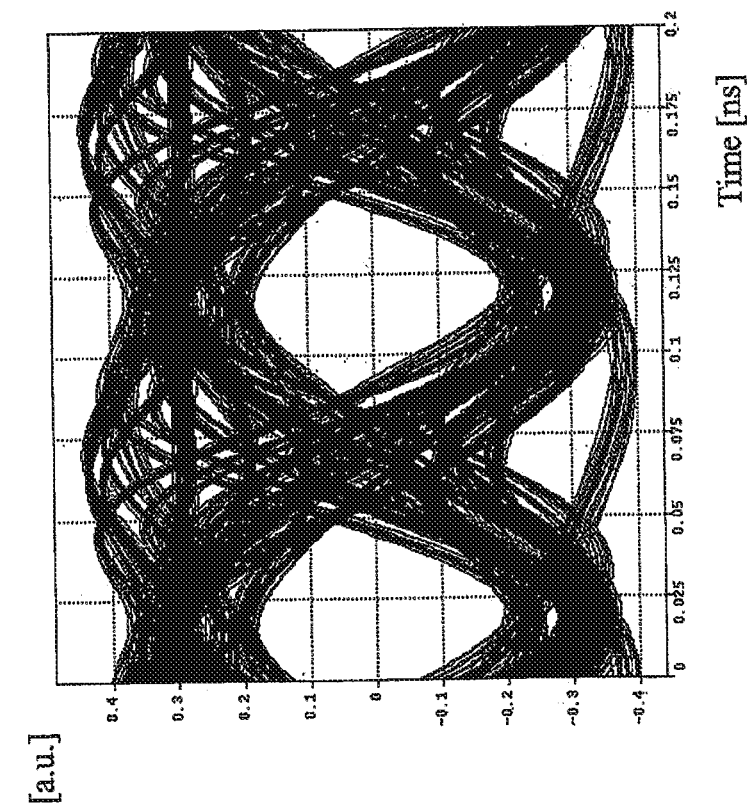
Figure 8B:
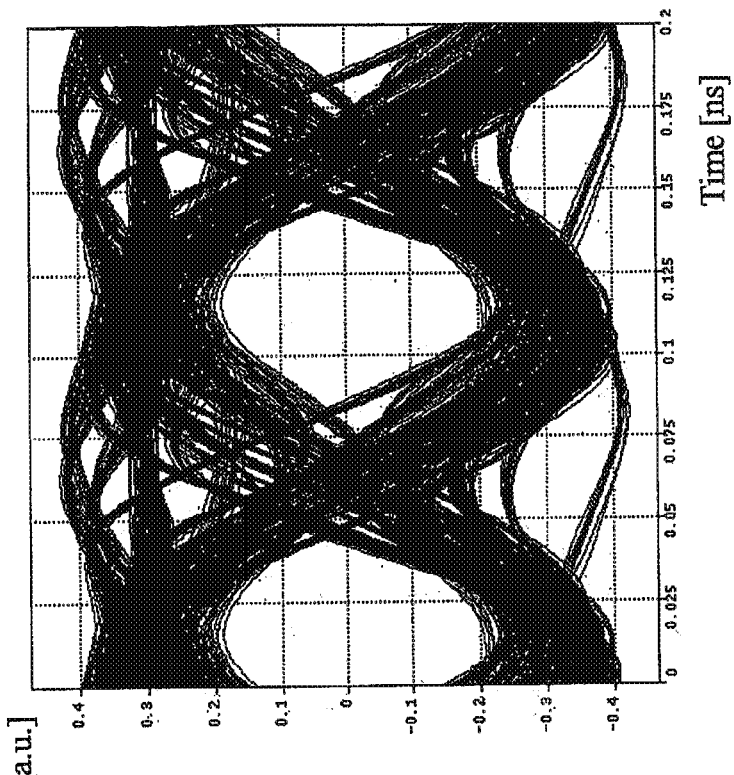
FIGS. 8a and 8b show simulated eye diagrams of a NRZ DQPSK signal at 10 Gbit/s generated by a DD-MZM transmitter with ER=12 dB before and after phase correction, respectively.
Figure 8A:
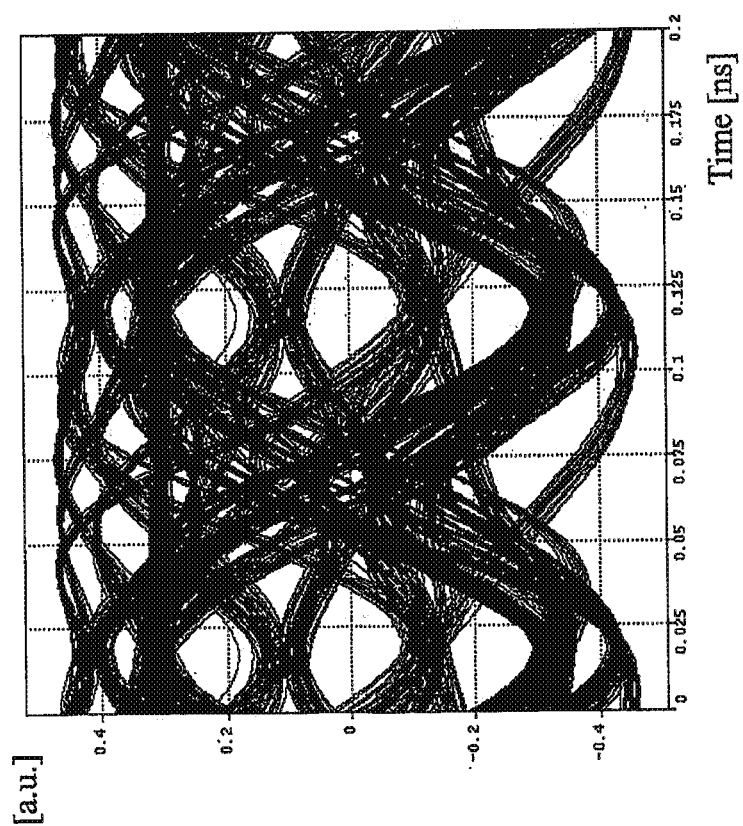

By way of comparison, FIGS. 6, 7 and 8 report the simulated optical eye diagrams of an exemplary DQPSK signal at 10 Gsymbol/s generated by a non-ideal DD-MZM transmitter and back-to-back received by a couple of unbalanced MZ interferometers in the case of different values of the DD-MZM ER (FIG. 6a and FIG. 6b: ER=20 dB, FIG. 7a and FIG. 7b: ER=15 dB, FIG. 8a and FIG. 8b: ER=12 dB). Simulations are performed with a DD-MZM electrical bandwidth of 20 GHz and by making use of the circuitry of FIG. 5 for phase correction. A laser line-width of 2 MHz, a transmitter bandwidth of 20 GHz and a noisy electrical receiver (NEP=15 pW/sqrt(Hz)) with 10.5 GHz bandwidth were the other simulation parameters.

In the figures on the left the eye diagrams obtained with the DD-MZM alone are shown, while on the right the eye diagrams obtained in presence of the phase shifter correction are shown. The phase correction suitably induced by the phase shifter improves the eye opening, almost eliminating the distortion due to finite ER.

Tables 4 and 5 summarize performance improvements when applying the present invention, in terms of Q factor enhancement and eye opening recovery. Eye opening values are compared to the bottom line, where a sufficiently high value of ER (ER=500 dB) simulates the ideal case of infinite ER. Simulations demonstrate that by applying the present invention also to a 12 dB extinction ratio DD-MZM it is possible to overcome the performance of a 20 dB ER MZM.

TABLE 4

| RF Extinction Ratio [dB] | Q w/o phase correction [dB] | Q w/phase correction [dB] |
|---|---|---|
| 12 | 8.71 | 18.41 |
| 15 | 11.66 | 20.12 |
| 20 | 16.28 | 22.88 |
| 500 | 25 | 25 |

TABLE 5

| RF Extinction Ratio [dB] | Eye opening without phase correction | Eye opening with phase correction |
|---|---|---|
| 12 | 0.276 | 0.79 |
| 15 | 0.52 | 0.85 |
| 20 | 0.75 | 0.943 |
| 500 | 1 | 1 |

An advantage of the invention is the relaxation of the constraints on ER when manufacturing interferometric modulators, such as DD-MZM.

In the following, it is described the case of an MPSK signal having M=8, as an example of application of the present invention to multilevel optical phase signal modulation with more than M=4 levels. Reference numerals of FIG. 2 will be used whenever appropriate. By employing a DD-MZM 60 and by driving the two electrodes 65, 66 with multilevel electrical signals $V_1$, $V_2$ having the condition of a $\pi/2$ bias point, i.e. the difference between the two voltage signals is equal to about $1/2\ V_\pi$, it is possible to obtain an 8-level PSK modulated signal. The condition of a $\pi/2$ bias point is equivalent to the condition that the phase difference between the phase-shifts $\phi_1$, $\phi_2$ applied to the optical radiation traversing respectively the first and second arm 63, 64 is equal to about $\pi/2$. Table 6 shows an exemplary set of values of signals $V_1$ and $V_2$ and the corresponding transmitted phase symbol $\phi_{sym}$, when not considering the MZM's ER (ideal DD-MZM).

TABLE 6

| $V_1$ | $1/4\ V_\pi$ | $1/2\ V_\pi$ | $3/4\ V_\pi$ | $V_\pi$ | $5/4\ V_\pi$ | $3/2\ V_\pi$ | $7/4\ V_\pi$ | $2\ V_\pi$ |
|---|---|---|---|---|---|---|---|---|
| $V_2$ | $-1/4\ V_\pi$ | 0 | $1/4\ V_\pi$ | $1/2\ V_\pi$ | $3/4\ V_\pi$ | $V_\pi$ | $5/4\ V_\pi$ | $3/2\ V_\pi$ |
| $\phi_{sym}$ (8-PSK) | 0 | $\pi/4$ | $\pi/2$ | $3/4\pi$ | $\pi$ | $5/4\pi$ | $3/2\pi$ | $7/4\pi$ |

When considering the finite value of modulator's ER, a phase deviation (1), is added to the constellation according to equation (4), which is valid independently from the number of levels M. The induced impairment over the transmitted signal is even higher than the one over a 4-level QPSK signal, because the transmitted phase symbols have a closer phase distance from each other. To recover the correct constellation a phase-shifting device 40 can be employed. The amount of phase the device 40 should add or subtract depends on the MZM's ER according to equation (5). The sign of the phase corrections, and consequently the correction algorithm, can be obtained from the table of the effectively transmitted phase symbols.

In a preferred configuration, the apparatus comprising the modulator 20 and the phase shifter 40 is optically integrated, optionally in a monolithic structure, possibly also integrating an optical source. Advantages of this preferred configuration are its compact-size and the fact that it remains more insensitive to environmental perturbation than a non-integrated solution, e.g. a fiber-based solution. In case the modulator 60 is a DD-MZM, it does not need any stabilization control loop, its structure being optically integrated.

The inventive apparatus can be very easily adjusted to ensure it works with different DD-MZM extinction ratios, by simply varying the phase-shifter driving voltage ($V_3$). In this way it is unnecessary to provide MZM 60 with an exact ER when transmitters have to be produced in quantity, reducing discard rate.

The present invention also contemplates any combination of MPSK or DMPSK with any other modulation technique, such as intensity (IM) or amplitude modulation (ASK) or polarization shift keying (POLSK).

The present invention finds particularly advantageous applications in any combination of the MPSK or DMPSK formats with any multiplexing technique, such as wavelength division multiplexing (WDM) or polarization division multiplexing (PolDM).

In fact MPSK is able to increase the data transmission spectral efficiency by a factor of N with respect to OOK transmission and moreover it has been shown a high robustness towards strong optical filtering, thus allowing a closer allocation of adjacent optical channel in a DWDM optical system.

The invention claimed is:

1. An optical system comprising:
   an optical modulator being configured to output a multilevel phase shift keyed optical signal including a stream of optical pulses, the optical modulator having an extinction ratio ($ER_{lin}$); and
   a phase shifter optically coupled to the output of the optical modulator for receiving the multilevel phase shift keyed optical signal, the phase shifter applying to each of the optical pulses a phase shift having an equal magnitude and a sign, the magnitude of the phase shift selected based on the extinction ratio of the optical modulator.

2. The optical system of claim 1, wherein the magnitude of the phase shift is inversely proportional to the extinction ratio.

3. The optical system of claim 1, wherein the magnitude of the phase shift is approximately equal to $$\mathrm{arctg}\left(\frac{1}{ER_{lin}}\right).$$

4. The optical system of claim 1, wherein the magnitude of the phase shift is less than about $\pi/10$.

5. The optical system of claim 1, wherein a sign of the phase shift is determined for each optical pulse based on a phase value of the optical pulse.

6. The optical system of claim 1, wherein the optical modulator is a dual-drive Mach-Zehnder modulator.

7. The optical system of claim 1, wherein the multilevel phase shift keyed optical signal is a quadrature phase shift keyed optical signal.

8. The optical system of claim 1, wherein the multilevel phase shift keyed optical signal is an eight-level phase shift keyed optical signal.

9. A method of operating an optical phase-shifting device, the method comprising:

determining an extinction ratio (ER) of an optical modulator disposed upstream of the optical phase-shifting device;

receiving at the optical phase-shifting device a multilevel phase shift keyed optical signal output by the modulator, the multilevel phase shift keyed optical signal including a stream of optical pulses; and calibrating the optical phase-shifting device to apply to each of the optical pulses a phase shift having an equal magnitude and a sign, the magnitude selected based on the extinction ratio.

10. The method of claim 9, wherein the magnitude of the phase shift is selected in inverse proportion to the extinction ratio.

11. The method of claim 9, wherein the magnitude of the phase shift is approximately equal to $$\mathrm{arctg}\left(\frac{1}{ER_{lin}}\right).$$

12. The method of claim 9, wherein the magnitude of the phase shift is less than about $\pi/10$.

13. The method of claim 9, wherein a sign of the phase shift is determined for each optical pulse based on a phase value of the optical pulse.

14. The method of claim 9, wherein the multilevel phase shift keyed optical signal is a quadrature phase shift keyed optical signal.

15. The method of claim 14, wherein the quadrature phase shift keyed optical signal includes pulses having a first pair of phase values separated by $\pi$ and pulses having a second pair of phase values separated by $\pi$, the second pair of phase values being separated from the first pair of phase values by $\pi/2$, wherein a phase shift having positive sign is applied to optical pulses having a phase value in the first pair of phase values; and wherein a phase shift having negative sign is applied to optical pulses having a phase value in the second pair of phase values.

16. The method of claim 9, wherein the multilevel phase shift keyed optical signal is an eight-level phase shift keyed optical signal.

* * * * *